(12) United States Patent
Grosskopf et al.

(10) Patent No.: US 11,002,327 B2
(45) Date of Patent: May 11, 2021

(54) ADJUSTER UNIT FOR A VEHICLE DISC BRAKE, AND DISC BRAKE HAVING THE SAME

(71) Applicant: WABCO Europe BVBA, Brussels (BE)

(72) Inventors: Ralf Grosskopf, Lobach (DE); Wieslaw Strzala, Byczyna (PL)

(73) Assignee: WABCO Europe BVBA, Brussels (BE)

( * ) Notice: Subject to any disclaimer, the term of this patent is extended or adjusted under 35 U.S.C. 154(b) by 148 days.

(21) Appl. No.: 16/096,858

(22) PCT Filed: Apr. 12, 2017

(86) PCT No.: PCT/EP2017/000476
§ 371 (c)(1),
(2) Date: Oct. 26, 2018

(87) PCT Pub. No.: WO2017/220180
PCT Pub. Date: Dec. 28, 2017

(65) Prior Publication Data
US 2019/0136925 A1    May 9, 2019

(30) Foreign Application Priority Data

Jun. 21, 2016   (EP) ..................... 16001396

(51) Int. Cl.
*F16D 65/56*       (2006.01)
*F16D 55/2255*   (2006.01)

(52) U.S. Cl.
CPC ....... *F16D 65/567* (2013.01); *F16D 55/2255* (2013.01)

(58) Field of Classification Search
CPC ....... B61H 15/005; F16D 65/68; F16D 65/70; F16D 65/568; F16D 65/567;
(Continued)

(56) References Cited

U.S. PATENT DOCUMENTS 3,111,822 A * 11/1963 Hansen ................... F16D 49/04
464/40
3,240,309 A *   3/1966 Packer .................. F16D 41/206
192/107 T
(Continued)

FOREIGN PATENT DOCUMENTS

DE     102014017438 A1   5/2016
EP         2476929 A1   7/2012

OTHER PUBLICATIONS

European Patent Office, Rijswijk, Netherlands, International Search Report of International Application No. PCT/EP2017/000476, dated Jul. 18, 2017, 3 pages.

*Primary Examiner* — Bradley T King
*Assistant Examiner* — Stephen M Bowes
(74) *Attorney, Agent, or Firm* — Dickinson Wright PLLC

(57) ABSTRACT

An adjuster unit (100) for a vehicle disc brake (1), in particular an air disc brake (1) of a commercial vehicle, includes an adjustment spindle (101) adapted to be operatively coupled with one of the brake pads (9) such that by rotation in a first direction, the adjustment spindle (101) moves the brake pad (9) towards the disc (11). By rotation in a second direction opposite of the first direction, the adjustment spindle (101) moves the brake pad away from the disc (11). An actuator ring assembly (107) is rotatable about the adjustment spindle (101); and a wrap spring (109) is helically wound around the adjustment spindle (101). The wrap spring (109), being part of the adjuster unit, is positioned on the adjuster unit, in particular on the adjustment spindle, to engage a stop (117) upon rotation of the adjustment spindle (101) in the second direction, causing the diameter of the wrap spring (109) to increase.

17 Claims, 10 Drawing Sheets

(58) Field of Classification Search
CPC ...... F16D 55/2255; F16D 49/02; F16D 49/04; F16D 2127/02; F16D 2127/04; F16D 41/206; F16D 13/75; F16D 13/752; F16D 13/755; F16D 13/757

See application file for complete search history.

(56) References Cited

U.S. PATENT DOCUMENTS

| | | | | |
|---|---|---|---|---|
| 3,298,486 | A * | 1/1967 | Perryman | F16D 13/08 |
| | | | | 192/47 |
| 4,321,986 | A * | 3/1982 | Thistleton | F16D 65/567 |
| | | | | 188/196 F |
| 4,487,295 | A * | 12/1984 | Mitchell | F16D 65/18 |
| | | | | 188/106 F |
| 4,721,190 | A * | 1/1988 | Schmidt | F16D 65/567 |
| | | | | 188/71.9 |
| 5,295,561 | A * | 3/1994 | Le Moigne | F16D 65/563 |
| | | | | 188/196 BA |
| 2006/0118369 | A1 * | 6/2006 | Fischer | F16D 65/568 |
| | | | | 188/218 XL |
| 2017/0307035 | A1 * | 10/2017 | Henning | F16D 65/18 |

* cited by examiner

ADJUSTER UNIT FOR A VEHICLE DISC BRAKE, AND DISC BRAKE HAVING THE SAME

TECHNICAL FIELD

The present invention relates to an adjuster unit for a vehicle disc brake, in particular an air disc brake of a commercial vehicle. The invention further relates to such a disc brake having an adjuster unit.

BACKGROUND OF THE DISCLOSURE

Adjuster units of the aforementioned type are generally known in the art. The adjuster units are employed in disc brake systems in order to successively adjust the slack which occurs in a disc brake system due to the wear of the brake pad. Due to the braking friction between a disc and the braking pads of a disc brake system, the pads become thinner and thinner. The brake pads need to travel a longer distance with increasing wear in order to achieve the same braking force as before. The adjuster unit compensates for this generally in the following manner: In a vehicle having a disc brake, the disc brake having a brake caliper, the brake caliper preferably having a thrust piece, a pair of brake pads, a disc positioned in between the brake pads, the adjustment unit comprises an adjustment spindle adapted to be operatively coupled with one of the braking pads, and engage a threaded bore provided in the brake caliper, in particular in the thrust piece, such that by rotation in a first direction, the adjustment spindle moves the brake pad towards the disc, and by rotation in a second direction opposite of the first direction, the adjustment spindle moves the brake pad away from the disc. The operation of the adjustment spindle is achieved by an actuator ring assembly that is rotatable about the adjustment spindle. The actuator ring assembly is operatively coupled to the adjustment spindle with a wrap spring that is helically wound around the adjustment spindle. Similar to wrap spring clutches, the coupling is such that during rotation of the actuator ring assembly in the first direction, the actuator ring assembly and the adjustment spindle are non-rotatably connected to one another, meaning that they are clamped together by the wrapping force of the spring and move in unison, and during rotation of the actuator ring assembly in the second direction, the actuator ring assembly rotates about the adjustment spindle because the wrap spring allows the actuator ring assembly and the spindle to slip relative to each other.

While the aforementioned mechanism works satisfactorily for the regular adjustment procedure, it has been found that its functionality deserves improvement for the de-adjustment procedure, i.e. a rotation of the adjustment spindle in the second direction. Whenever a brake pad has excessively worn down and needs to be replaced, the adjustment spindle has to be returned into a position further away from the disc. In order to do so, the adjustment spindle has to be rotated in the second direction. Since the actuator ring assembly cannot be employed for this operation because it is only operatively coupled non-rotatably with the spindle in the first direction, the adjustment spindle needs to be driven directly in the second direction. This, however, upon applying torque to the adjustment spindle in the second direction, initially causes the wrap spring to clamp on the adjustment spindle like it would when actuating the actuator ring assembly in the first direction. As a consequence thereof, significant torque has to be applied for moving the adjustment spindle away from the disc. The necessary torque which needs to be applied is considered detrimental.

SUMMARY OF THE INVENTION

It was therefore an object of the invention to provide an adjuster unit for a vehicle disc brake with improved de-adjustment function. In particular, it was a further object of the invention to improve the functionality of the known adjuster unit also for the adjustment of the brake pad towards the disc.

The invention attains the aforementioned object by positioning the wrap spring, being part of the adjuster unit, on the adjuster unit, in particular on the adjustment spindle, to engage a stop upon rotation of the adjustment spindle in the second direction, causing the diameter of the wrap spring to increase. For doing this, the adjustment spindle preferably comprises a first end portion for coupling the spindle to the brake pad, and a second end portion opposite of the first end portion, the second end portion comprising a torque-transmitting interface, e.g. for engagement by a wrench. In embodiments where the adjuster unit comprises a wear sensor, which is connected in torque-transmitting manner to the adjustment spindle, the adjustment spindle may also be driven by engaging the wear sensor at a corresponding torque-transmitting interface.

The invention is based upon the realization that the torque imposed by the clamping of the wrap spring may easily be countered by widening the diameter of the wrap spring as soon as it is rotated in the second direction. Ideally, this is achieved by pushing a leading end of the spring against the stop which is stationary relative to the brake caliper, in particular thrust piece. As soon as the wrap spring is engaged by the stop, the diameter widens and as a consequence thereof, the torque necessary to continue rotation of the adjustment spindle in the second direction is significantly minimized.

In a preferred embodiment of the invention, the wrap spring is located between the adjustment spindle and the actuator ring assembly. Preferably, the orientation of the helical windings of the wrap spring is identical to the angle of the thread provided in the adjustment spindle and the threaded bore which the adjustment spindle engages. This enables the wrap spring to be located in between neighboring flanges of the thread of the adjustment spindle, ensuring reliable torque transfer on the one hand side and sufficient radial tolerance for widening the diameter on the other hand side. It also helps minimize radial build size.

In a particularly preferred embodiment, the adjustment unit comprises a support clip, the support clip holding the actuator ring assembly and being adapted for non-rotatable mounting to the brake caliper, in particular the thrust piece, wherein the support clip engages the wrap spring upon rotation of the adjustment spindle in the second direction.

The support clip may preferentially be used to securely position the adjuster unit relative to the brake caliper, in particular thrust piece. Increased precision regarding the positioning of the adjuster unit in turn leads to a more predictable and more precise adjustment procedure, as well.

In a further preferred embodiment, the brake caliper, in particular the thrust piece, or the support clip comprises the stop, and the stop is positioned so that it engages and end portion of the wrap spring, preferably the leading end of the wrap spring when the adjustment spindle rotates in the second direction.

Preferably the stop is formed as a protrusion extending in the axial direction of the support clip and/or in the radial direction of the support clip. Herein, the axial direction of the support clip is understood to be parallel to a longitudinal axis of the adjustment spindle. The radial direction accordingly is understood to be transverse to this longitudinal axis. Preferentially, the support clip is formed as an open ring and substantially has a C-shape.

Further preferably, the support holds the actuator ring assembly in a snap-fit when mounted to the actuator ring assembly. The support clip preferably is axially fixed to the actuator ring assembly. It is particularly preferred if the actuator ring assembly comprises a number of first guide elements defining an axial mounting position of the support clip on the actuator ring assembly, and further preferably a number of second guide elements defining an angular mounting position of the support ring on the actuator ring assembly. This reduces the risk of misaligning the support clip on the adjuster unit. The snap-fit function allows for quick and hassle-free mounting of the actuator ring assembly on the adjuster unit, i.e. the actuator ring assembly.

In a preferred embodiment, the adjuster unit comprises a pivot lever acting upon the actuator ring assembly in a direction transverse to the longitudinal axis of the adjustment spindle, causing the actuator ring assembly to rotate in the first direction. For this embodiment, it is particularly preferred if the support clip comprises at least one spring element, the spring element being adapted to elastically support the adjuster unit against the brake caliper, in particular the thrust piece, in the transverse direction of the adjustment spindle in which the pivot lever acts. This serves to limit the pressure acting on the adjustment spindle in the aforementioned transverse direction during the adjustment procedure, i.e. during rotation of the adjustment spindle in the first direction for moving the brake pad towards the disc. This in turn leads to a minimization of torque necessary for driving the adjustment spindle in the first direction and leads to an overall improved efficiency of the adjuster unit.

In a further preferred embodiment, the spring element extends radially outwards from the support clip. Preferably, the brake caliper, in particular the thrust piece, comprises a counter-surface adapted to accommodate the spring element after mounting the adjuster unit in the brake caliper. This way, the spring element not only acts as a resilient force against the pressure introduced by the pivot lever, but also contributes to a well-defined positioning of the adjuster unit as a whole.

The support clip in a further preferred embodiment comprises at least one form-lock connection element for positively securing the support clip to the brake caliper. Preferably, the thrust piece comprises a corresponding number of mating form-lock connection elements. The form-lock connection elements function to secure the support clip non-rotatably relative to the brake caliper.

The form-lock connection element is preferably formed as a tab extending radially outwards from the support clip.

Various manufacturing techniques are available for creating the support clip with its functional elements. One particularly preferred embodiment suggests that at least one of the stop, the spring element and the form-lock connection element are integrally formed with the support clip. Particularly preferred, the support clip is made of metal, preferably spring steel.

Preferentially, at least one of the stop, the spring element and the form-lock connection element are formed on the support clip by cutting and/or bending.

Preferably, the actuator ring assembly comprises a guide tube, and an actuator ring rotatably mounted on the guide tube. The actuator ring comprises engagement means for being driven by a pivot lever of the vehicle brake. Preferentially, the actuator ring is operatively coupled to the guide tube by a torsion spring that is also rotatably mounted around the guide ring and/or the actuator ring such that the torsion spring resiliently transfers torque between the actuator ring and the guide tube.

The embodiments explained hereinabove relate to an adjuster unit. However, the invention also relates to a vehicle disc brake, in particular an air disc brake of a commercial vehicle, the disc brake having a brake caliper, a pair of brake pads, and an adjuster unit. The invention attains the object mentioned hereinabove for a vehicle of the aforementioned type by providing an adjuster unit according to one of the preferred embodiments mentioned and described hereinabove.

The vehicle in accordance with the invention thus has the same advantages and preferred embodiments as the aforementioned adjuster unit. Reference is made to the explanations given hereinabove.

For a more complete understanding of the invention, the invention will now be described in more detail with reference to the accompanying drawing. The detailed description will illustrate and describe or is considered as a preferred embodiment of the invention. It should of course be understood that various modifications and changes in form or detail could readily be made without departing from the scope of the invention. It is therefore intended that the invention may not be limited to the exact form and detail shown and described herein.

Further, the disclosed features may be considered alone or in combination.

In particular, any reference signs in the claims shall not be construed as limiting the scope of the invention. The word "comprising" does not exclude other elements or steps. The wording "a" or "an" does not exclude a plurality.

DETAILED DESCRIPTION OF THE DRAWINGS

Figure 1:
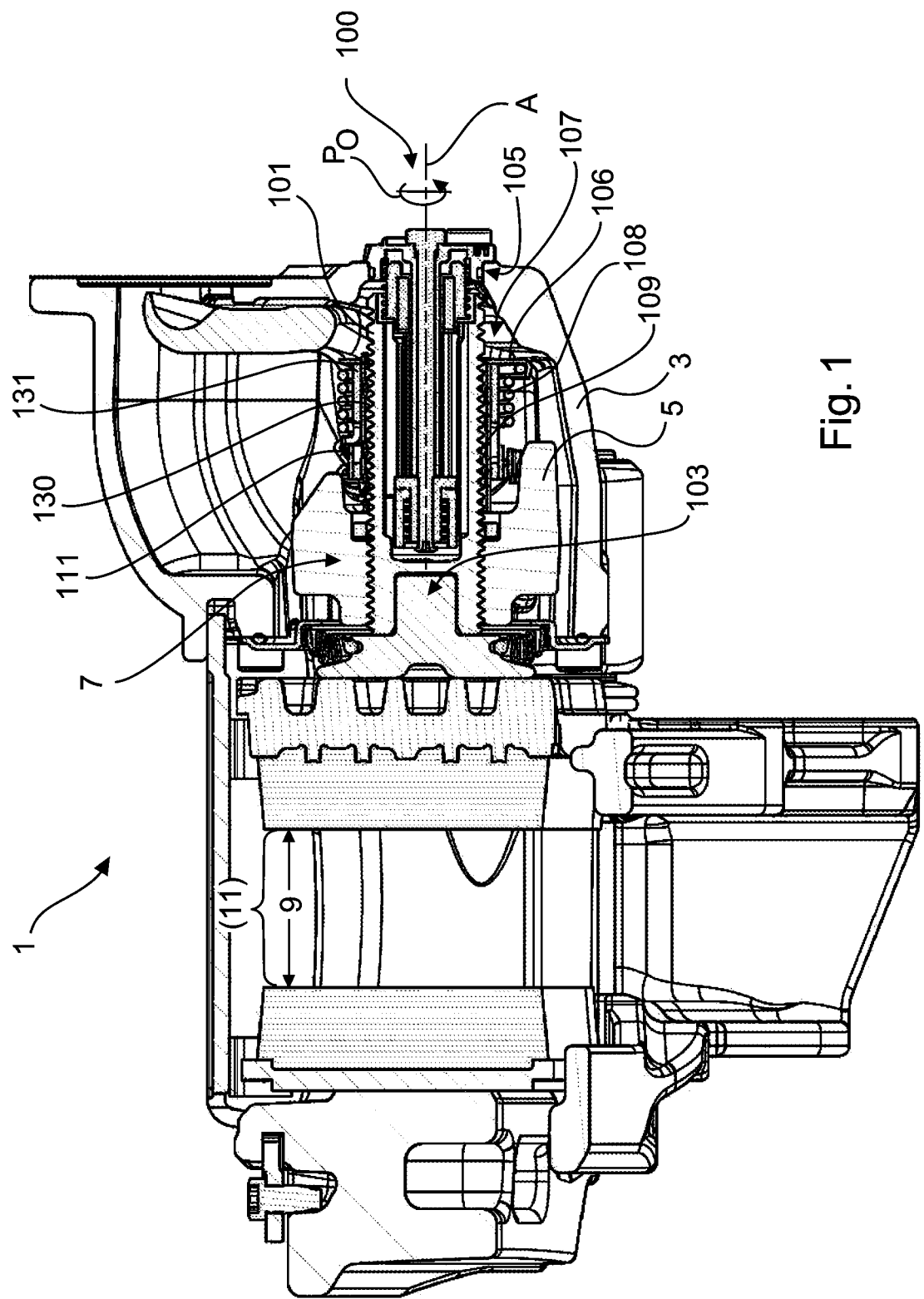
FIG. 1 shows a schematic cross-sectional view of a vehicle disc brake in accordance with a preferred embodiment.

FIG. 1 shows a vehicle disc brake 1. The disc brake 1 comprises a brake caliper 3 inside of which a thrust piece 5 is mounted. The thrust piece 5 comprises a threaded bore 7 which engages a correspondingly threaded adjustment spindle 101 of an adjuster unit 100 (see below).

The disc brake 1 further comprises a pair of brake pads 9 which are spaced apart from one another to accommodate a disc 11 (indicated but not shown) in between them.

The adjustment spindle 101 of the adjuster unit 100 comprises a first end portion 103 for operatively coupling the adjuster unit 100 to one of the brake pads 9. Opposite of the first end portion 103, the adjuster unit 100 comprises a second end portion 105 having an interface for a torque-transmitting device such as a wrench. The adjuster unit 100 may comprise a wear sensor which provides the torque-transmitting interface, or alternatively may directly comprise such a torque-transmitting interface.

The adjuster unit 100 further comprises an actuator ring assembly 107 which is placed around the adjustment spindle 101. The actuator ring assembly 107 is operatively coupled to the adjustment spindle 101 through a wrap spring 109 which is disposed between the two elements 101, 107.

A support clip 111 is mounted on the actuator ring assembly 107.

Preferably, the actuator ring assembly 107 comprises an inner guide tube 130, wherein the wrap spring 109 is disposed between the guide tube 130 and the adjustment spindle 101. The actuator ring assembly 107 further comprises a torsion spring 108 (cf. FIG. 5) which operatively couples the guide tube 130 to an actuator ring 131 through a disc 106 such that during rotation of the adjustment spindle 101 about its longitudinal axis A in a first direction, indicated by $P_0$, the torsion spring 108 produces a resilient torque against any relative movement of the actuator ring assembly 107 in relation to the adjustment spindle 101, i.e. any angular movement by which the rotation of the actuator ring assembly 107 exceeds the rotation of the adjustment spindle 101.

The function of the torsion spring 108 is thus to absorb any excess torque supplied to the actuator ring assembly 107 which does not (or cannot) lead to further rotation of the adjustment spindle 101, either because the brake pad 9 already abuts against the disc 11, or because the adjustment spindle 101 is already driven to its innermost position in the brake caliper 3.

Figure 2:
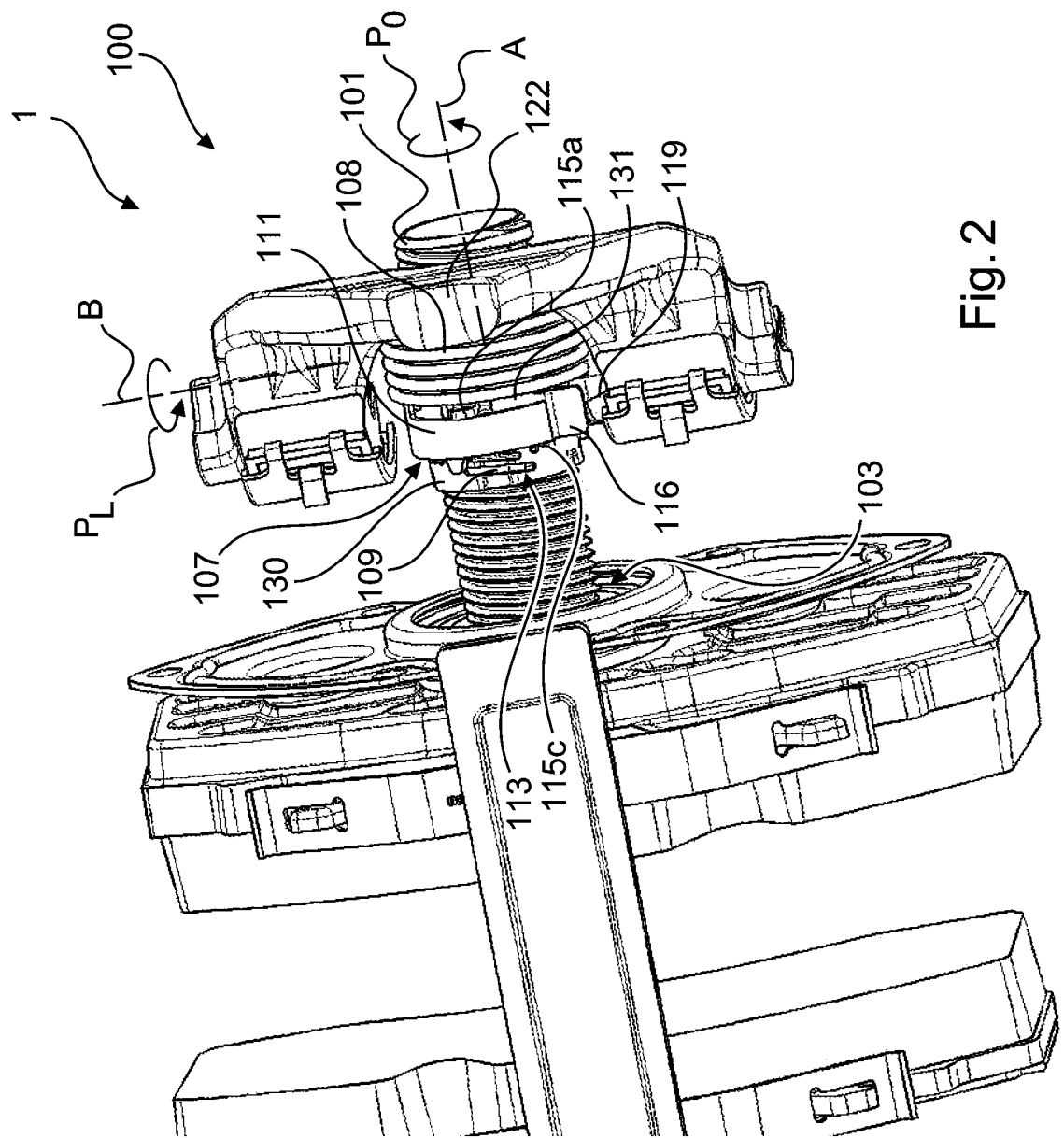
FIG. 2 shows a schematic partially exploded side-view of the vehicle disc brake of FIG. 1.

As can be seen from FIG. 2, the actuator ring assembly 107, in particular the inner guide tube 130, comprises a groove 113 through which the wrap spring 109 extends at least partially.

The support ring 111 holds the adjuster unit 100 in a snap-fit. The support ring 111 is axially held in place on the actuator ring assembly 107 with spaced-apart tabs 115$a,b$ and $c$ which are distributed along the circumference of the actuator ring assembly 107. The actuator ring assembly 107 further comprises a radially extending guiding means 116 for defining an angular position of the support ring 111.

The adjuster unit 100 further comprises a pivot lever 119 which is coupled to an actuating end 122. The pivot lever 119 is rotatably housed around a transverse axis B. In operation for adjusting the brake pad position, the pivot lever 119 is rotated in the direction of arrow $P_L$. The pivot lever 119 moves downwards, interacts with the actuator ring assembly 107 and causes a rotation of the adjustment spindle 101 about longitudinal axis A in the direction of arrow $P_0$. As the adjustment spindle 101 in FIG. 2 has a left-handed thread, the rotation is in the counter-clockwise direction, and leads to inwards movement of the adjustment spindle 101 towards the disc with its end portion 103. The rotation of the adjustment spindle 101 is achieved by the wrap spring 109 which is frictionally tightened by the rotational movement of the actuator ring assembly 107 and thus clamps the actuator ring assembly 107 to the adjustment spindle 101.

Figure 3:
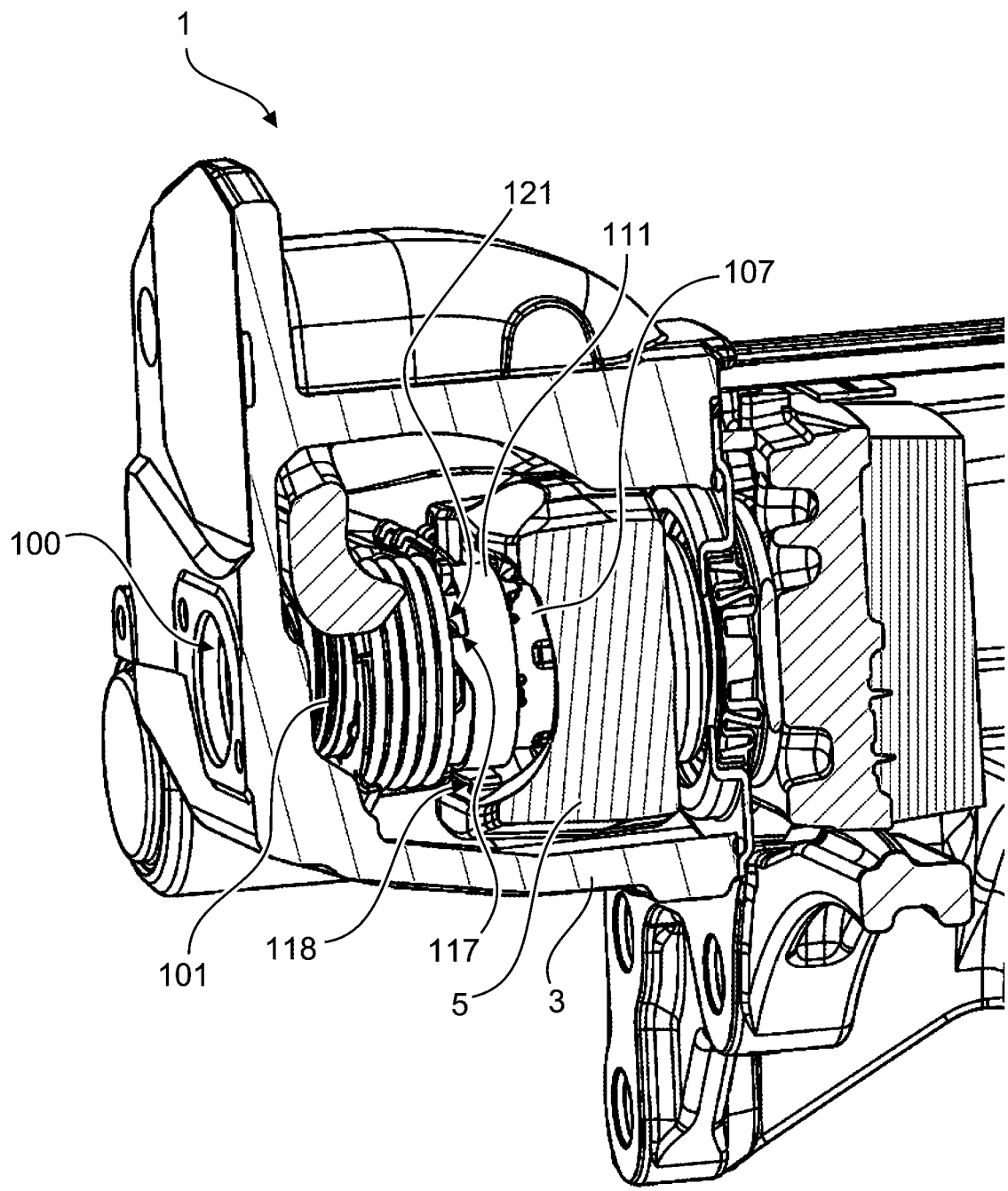
FIG. 3 shows a partial schematic side view of an adjuster unit of the vehicle disc brake of FIGS. 1 and 2.

In FIG. 3, the mounting position of the support clip 111 on the actuator ring assembly 107 is shown in more detail. As can particularly be seen in FIG. 3, the actuator ring assembly 107 comprises a passage 121 for the leading end 109$b$ (FIG. 5, FIG. 6) of the wrap spring 109 (FIG. 1,2). Adjacent and outwards of the passage 121, the support clip 111 comprises a stop 117 which is adapted to engage the leading end 109$b$ upon rotation of the adjustment spindle 101 in the second direction, as will be explained in more detail further below.

The support clip 111 comprises a spring element 118 which is supported against the thrust piece 5.

Figure 4:
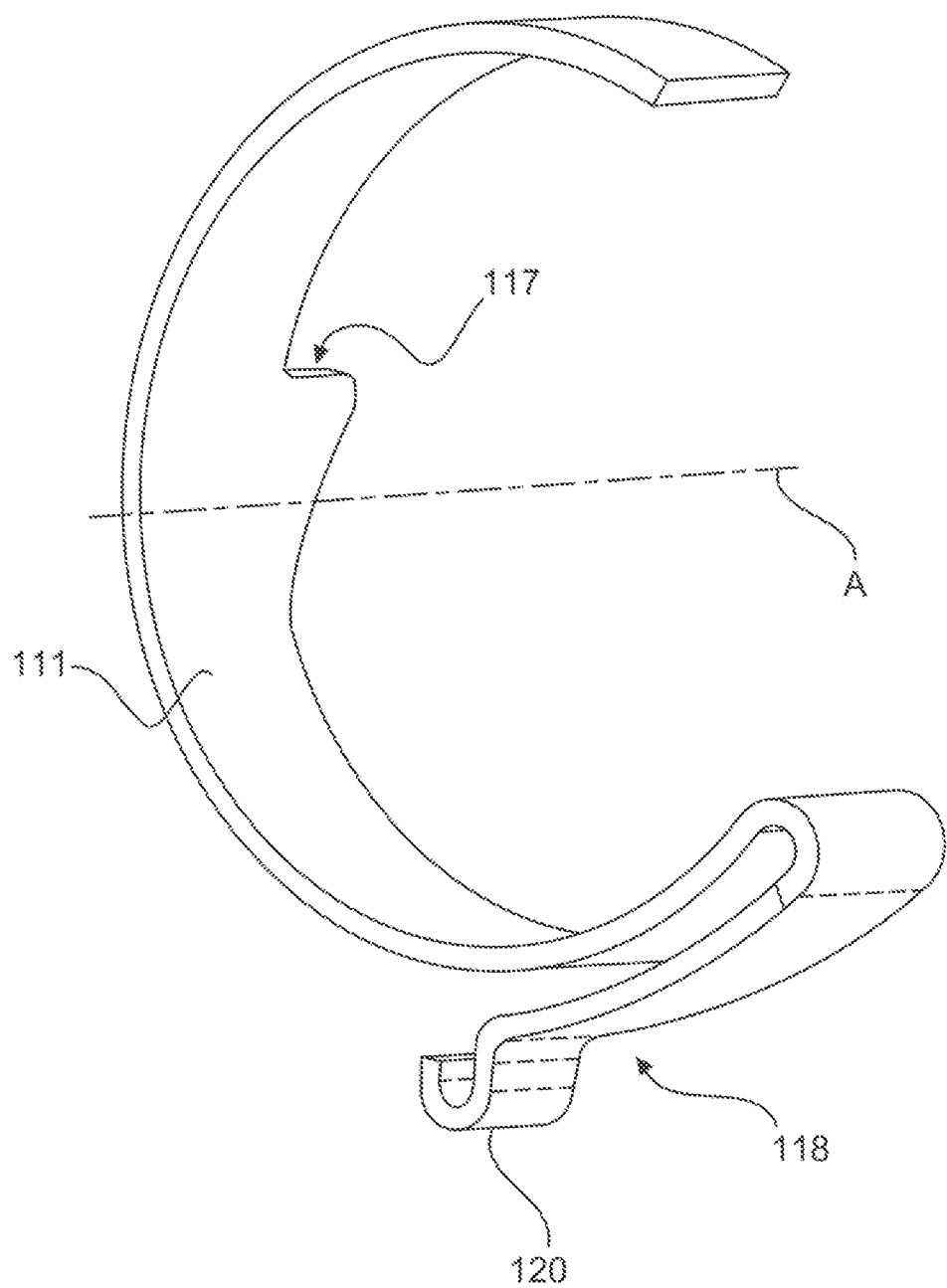
FIG. 4 shows a schematic view of a support ring for the adjuster unit of FIG. 2.

FIG. 4 shows the support clip 111 in more detail in an isolated view. The support clip 111 comprises a form-lock connecting element 120 which is located on the periphery of the spring element 118. The support clip 111 may comprise one or more further form-lock connecting elements, such as for example shown in FIG. 7$a,b$ (reference signs 120$a,b$).

The stop 117 is formed as a protrusion extending in the direction of axis A which is (in the mounted state of support clip 111) also the longitudinal axis of the adjustment spindle 101 (FIG. 3). The spring element 118 extends radially outwards from the base of support clip 111. While the stop 117 is formed by cutting, the spring element 118 is formed by bending the material of the support clip 111. Preferably, the material of the support clip 111 is a sheet metal, preferably spring steel. Alternatively, the geometry shown in FIG. 4 may also be created by molding an elastic polymer.

Figure 5:
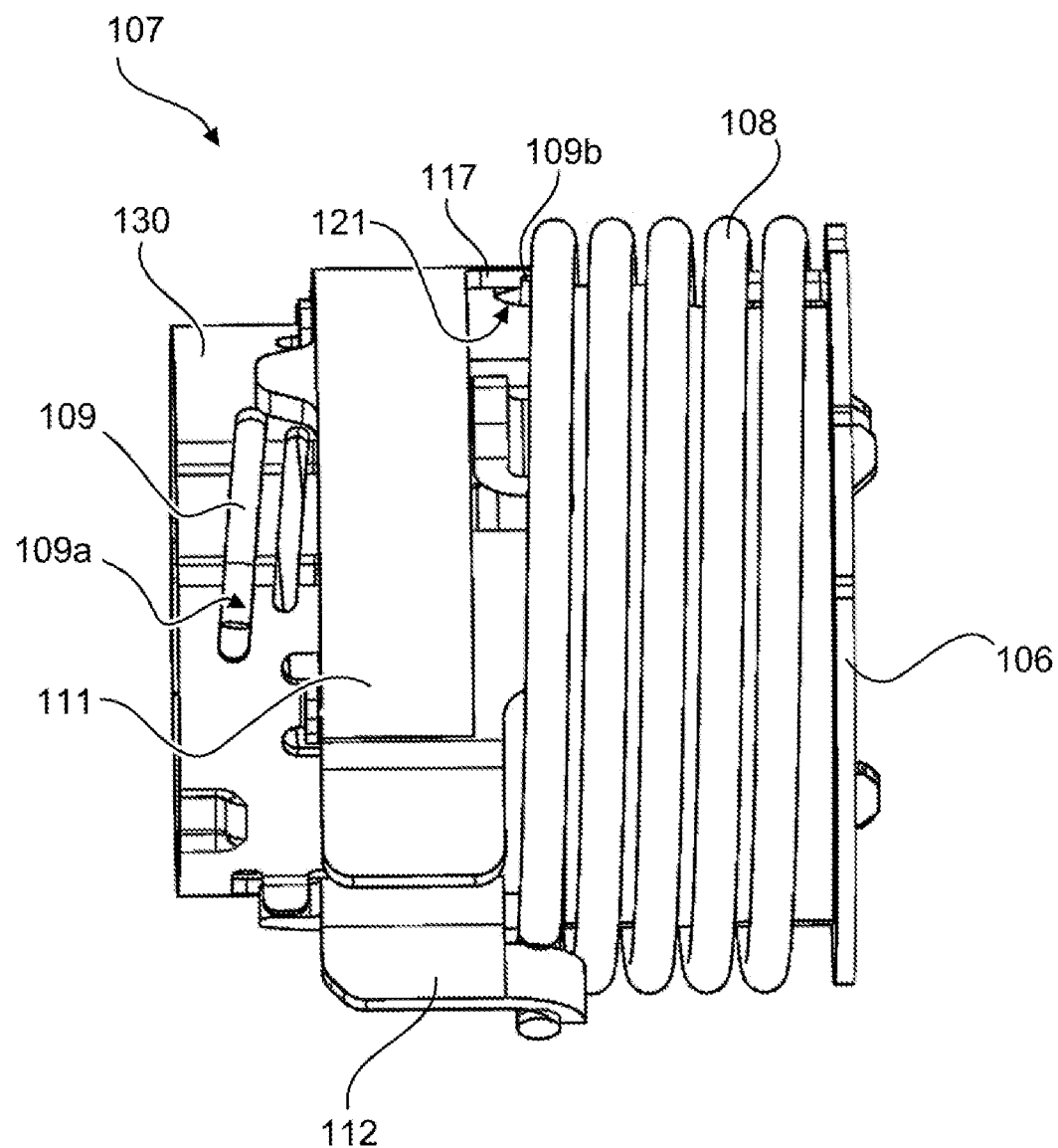
FIG. 5 shows a further schematic view of the adjuster unit of FIG. 3.

FIG. 5 shows the coupling of the torsion spring 108 with a radially protruding tab 112 of the actuator ring assembly 107. Also, FIG. 5 shows the trailing end 109$a$ of the wrap spring 109 extending outwards through the actuator ring assembly 107 for coupling. The passage 121 for accommodating the leading end 109$b$ of the wrap spring and the stop 117 of the support clip 111 are directly adjacent to one another.

Figure 6:
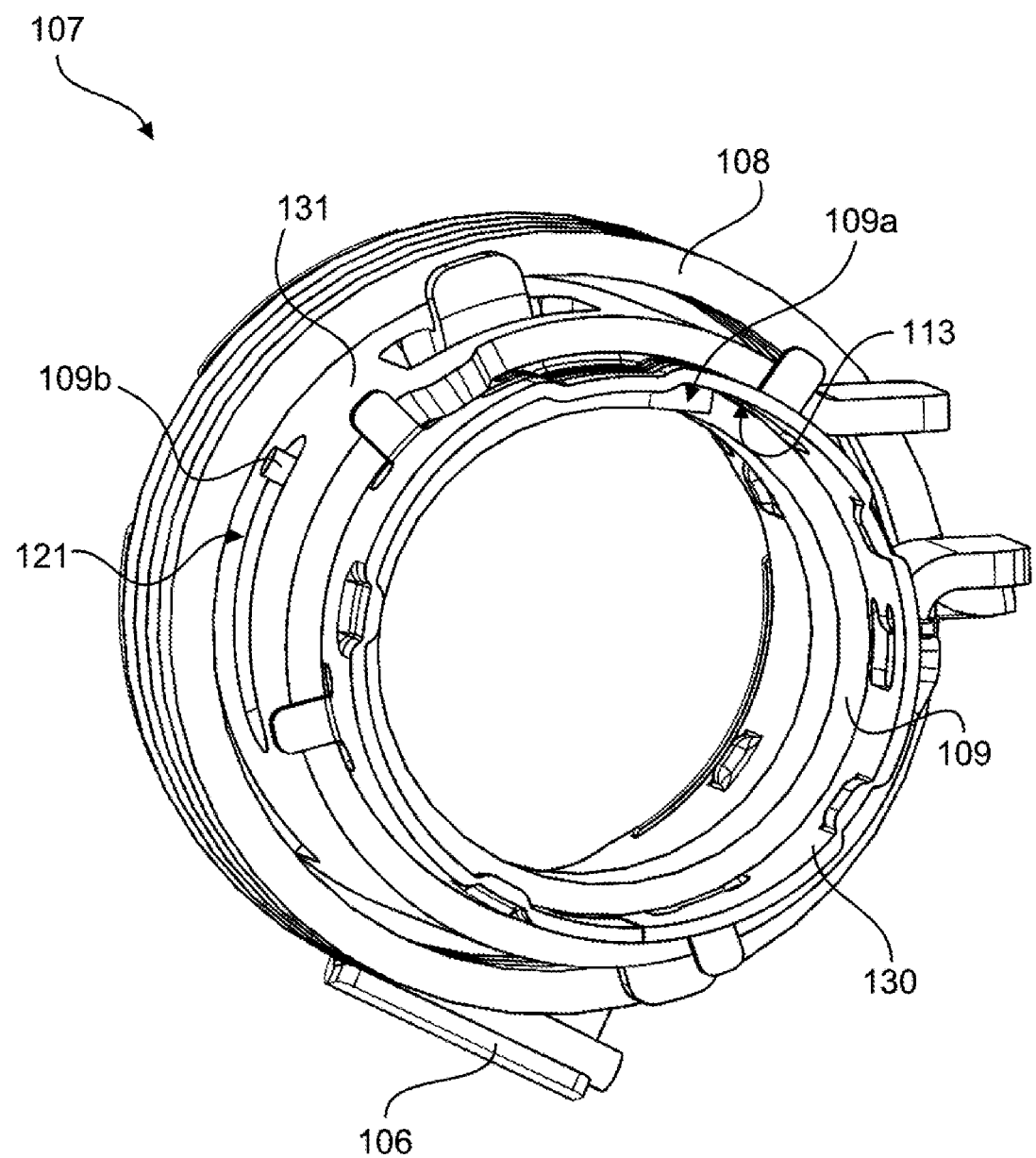
FIG. 6 shows a further schematic partial view of the adjuster unit of FIGS. 3 and 5, FIGS. 7*a*, 7*b*, and 7*c* show different schematic view of an adjuster unit according to the preferred embodiment of FIGS. 1 to 6.

While FIGS. 1 through 5 predominately show the actuator ring assembly 107 from the outside only, FIG. 6 depicts the inside of the actuator ring assembly 107, with the adjustment spindle being hidden. The wrap spring 109 extends through passage 121 such that the leading end 109$b$ projects radially outwards from the actuator ring assembly 107. In addition to the view of FIG. 5, FIG. 6 also shows the operative coupling of the torsion spring 108 with the disc 106.

Figure 7A:
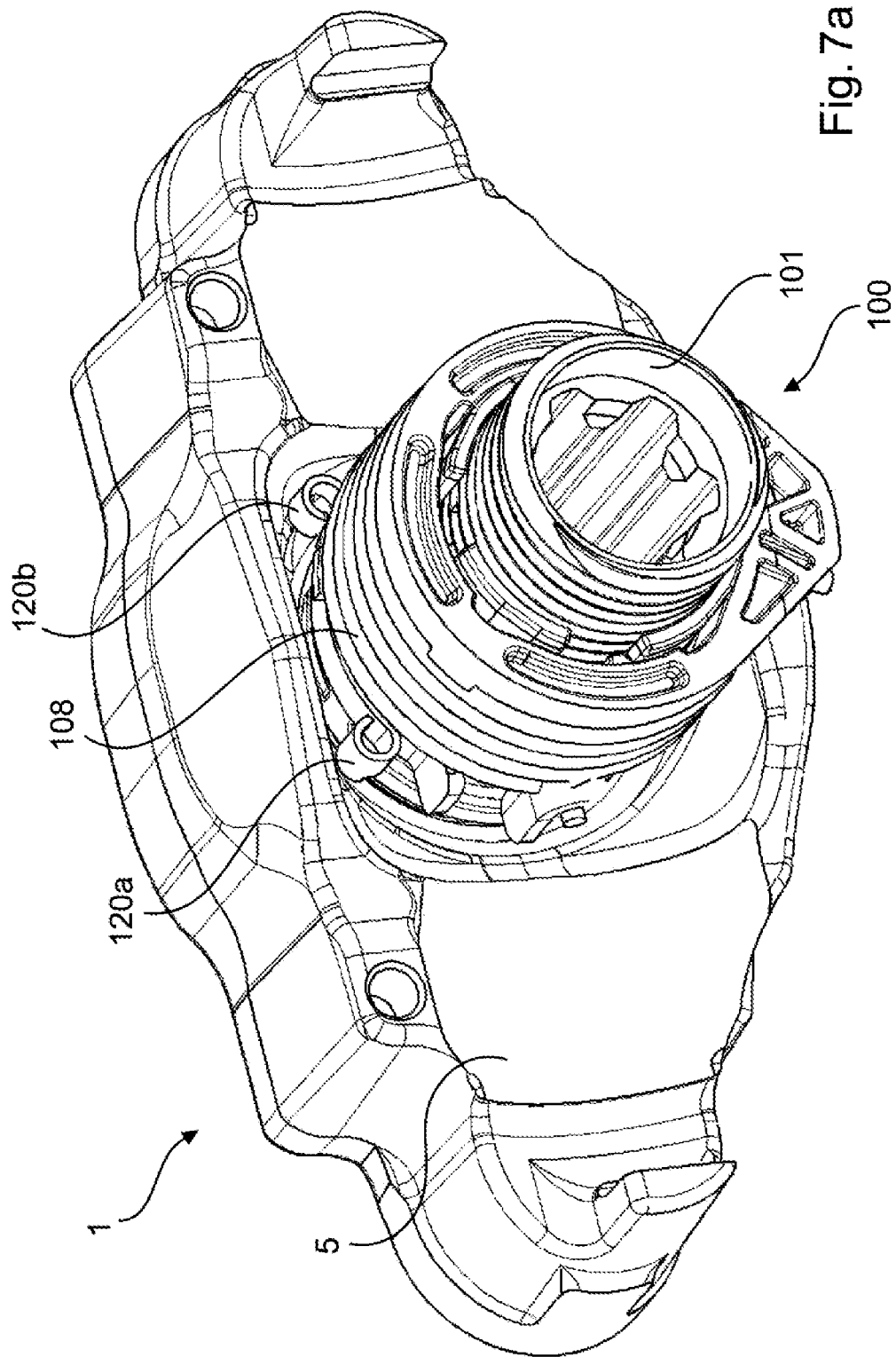
Figure 7B:
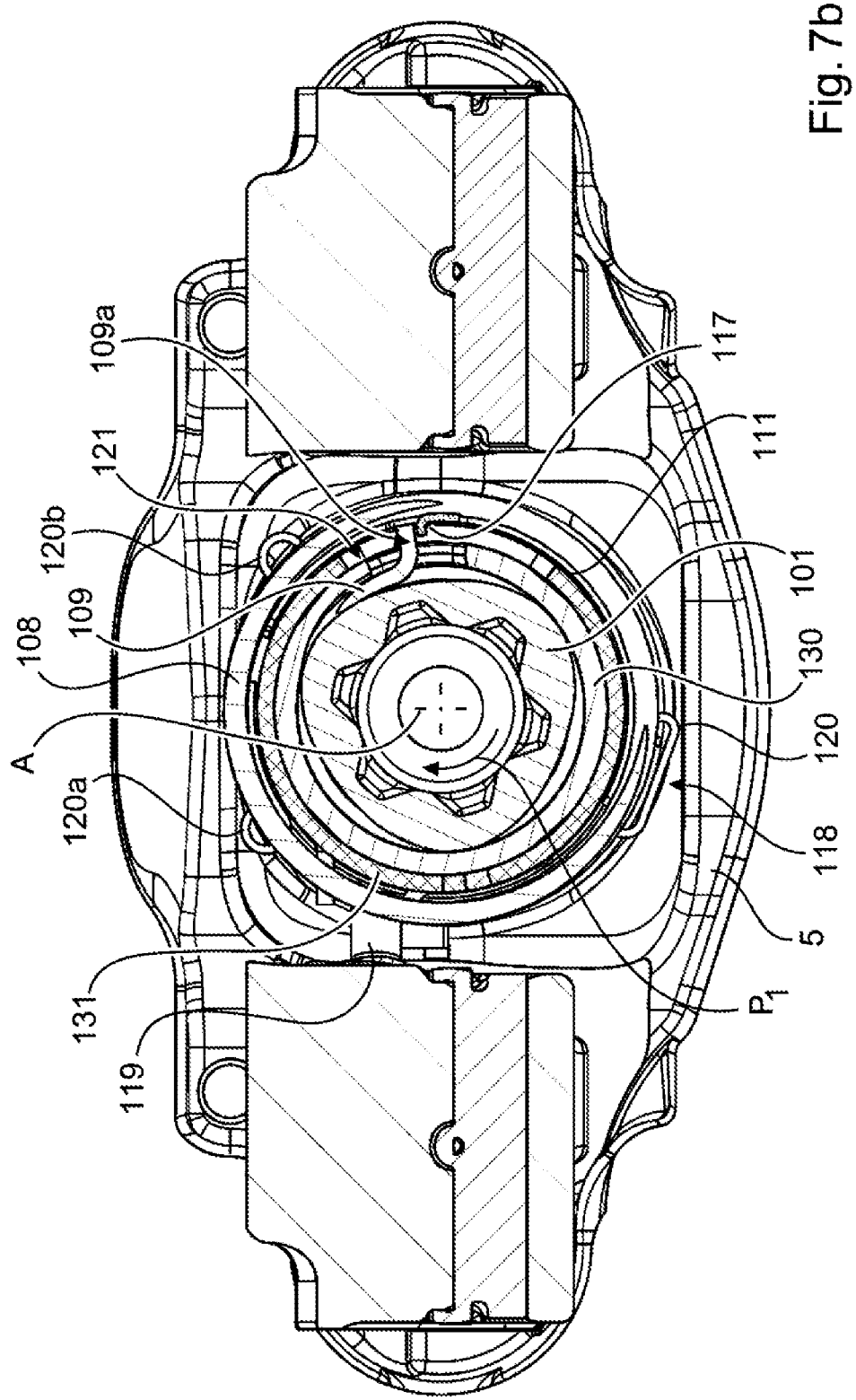
Figure 7C:
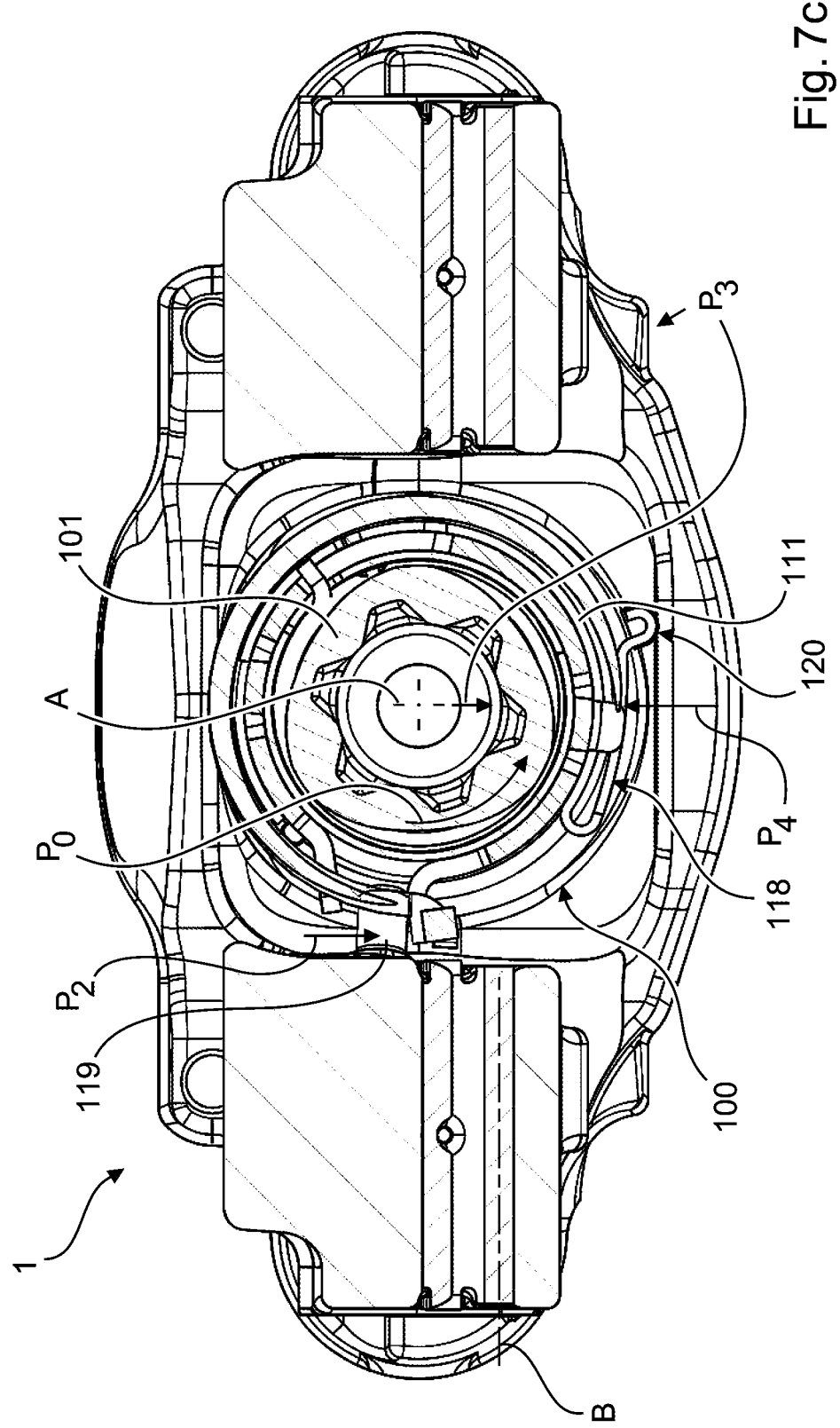

In FIG. 7$a$, the adjuster unit 100 is depicted when mounted to the thrust piece 5. Additionally to the spring element 119 (FIG. 7$b$), the support clip 111 is also rotationally held in place by additional form-lock connecting elements 120$a,b$ which are substantially opposite of spring element 119.

The so-called de-adjustment procedure, or loosening of the adjustment spindle 101, is shown schematically in FIG. 7$b$. When the adjustment spindle 101 is driven in the clockwise direction as indicated by $P_1$, which is the second direction in the above terms, the adjustment spindle 101 is rotated initially together with the actuator ring assembly 107 relative to the thrust piece 5 and the support clip 111. Immediately upon initiation of the rotational movement, the leading end 119$a$ of the wrap spring 119 abuts against the stop 117 of the support clip 111, however. The diameter of the wrap spring 119 is widened. The wrap spring is pushed away from the threaded flanges of the adjustment spindle 101 against the actuator ring assembly 107, thus reducing the friction on the adjustment spindle 101.

The opposite operating mode is shown in FIG. 7$c$. When the pivot lever 119 is moved downwards in the direction of arrow $P_2$ through pivoting movement around transverse axis B, a rotational movement in the first direction is initiated (indicated by arrow P₀). The adjustment spindle 101 is rotated about longitudinal axis A. Additionally, however, a downward resulting force in the direction of arrow P₃ is also imposed onto the adjustment spindle 101 by the pivot lever 119. This downward force is countered by the resilient force in the direction of arrow P₄ stemming from the spring element 119, effectively minimizing the pressure on the flanges of adjustment spindle 101 during the rotational movement.

Figure 8:
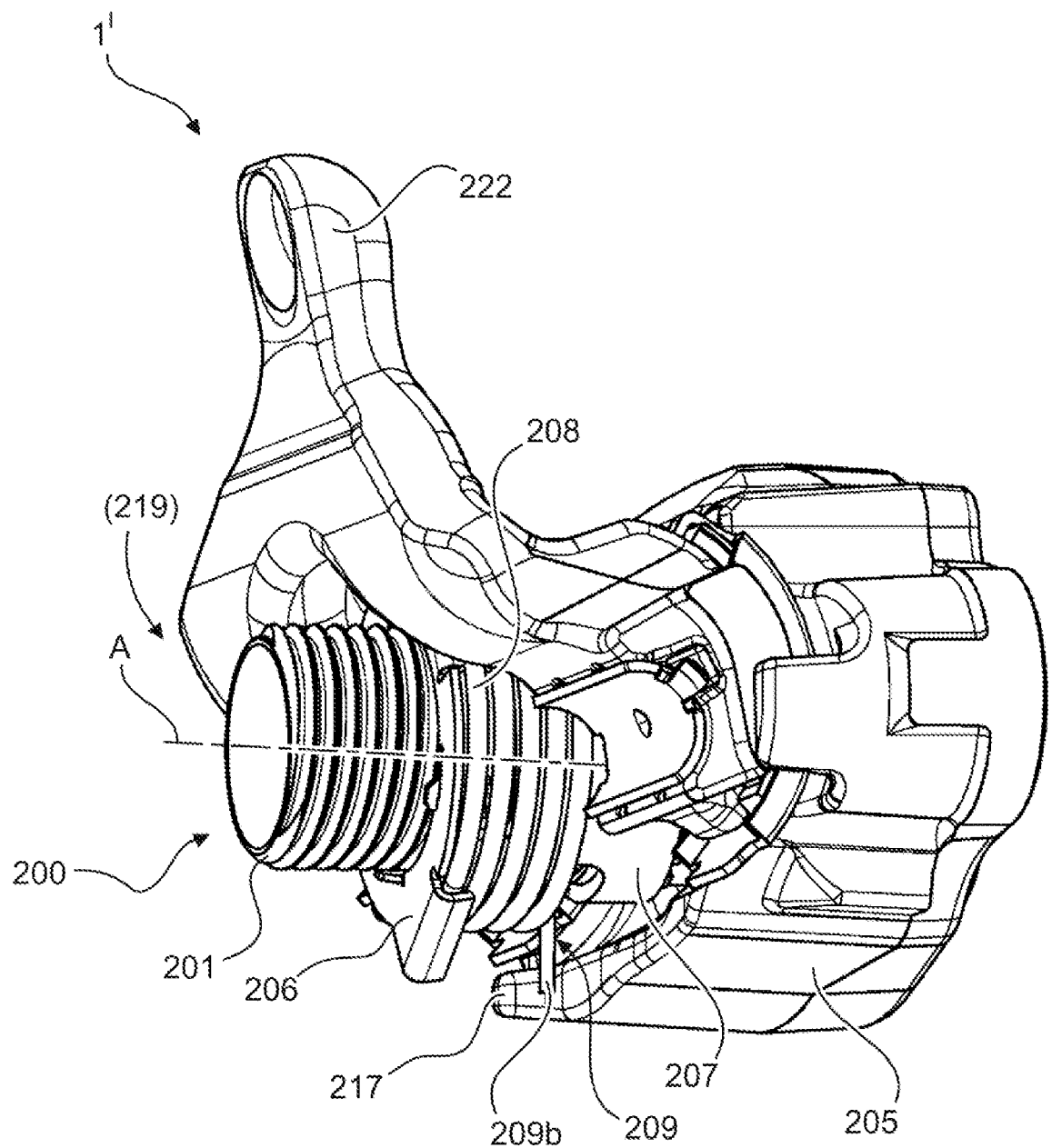
FIG. 8 shows a partial view of an alternative embodiment of the adjuster unit.

While FIGS. 1 through 7 consistently show, according to a first preferred embodiment, the adjuster unit 100 on a vehicle disc brake 1, wherein the adjuster unit 100 comprises a support clip 111 having the stop 117, FIG. 8 shows an alternative embodiment.

In FIG. 8 a vehicle disc brake 1' is shown. The vehicle disc brake 1' comprises an adjuster unit 200 having an adjustment spindle 201 engaging a thread of a thrust piece 205. The functioning principle and installation of the adjuster unit 200 and adjustment spindle 201 is identical to the embodiment of FIGS. 1 through 7, which is why reference is made to the explanations herein above. A noteworthy difference is that the adjuster unit 200 does not comprise a support clip such as support clip 111 of the embodiment of FIGS. 1 through 7. Instead, it is the thrust piece 205 which comprises a stop 217 which is formed as a protrusion extending essentially in the direction of axis A of the adjustment spindle 201. Like in the previous embodiment, the adjuster unit 200 comprises a wrap spring 209, a leading end 209b of which extends radially outwards towards the stop 217. Upon rotation of the adjustment spindle 201 in the second direction, the stop 217 engages the leading end 209b of the adjustment spindle 201.

An adjuster ring assembly 207 is also part of the adjustment spindle 200 and functions in the manner described hereinabove with regard to the first embodiment of FIGS. 1 through 7. The same holds true for a torsion spring 208, a disc 206 holding the torsion spring 208, a pivot lever 219 coupled to an actuating end 222, and all other elements shown but not referenced in FIG. 8, but identical to the embodiment of FIGS. 1 through 7.

As has been claimed with respect to the aforementioned figures, the provision of a stop 117, 217 either directly on a thrust piece 205 or on a supporting clip 111 with its inventive features provides a significant improvement in the operation of the adjuster unit 100 in a vehicle disc brake 1, both in the adjusting and de-adjusting procedures.

While the above description constitutes the preferred embodiments of the present invention, it will be appreciated that the invention is susceptible to modification, variation and change without departing from the proper scope and fair meaning of the accompanying claims.

The invention claimed is:

1. An adjuster unit (100; 200) for a vehicle disc brake (1; 1') of a commercial vehicle, the disc brake (1) having a brake caliper (3), the brake caliper having a thrust piece (5; 205), a pair of brake pads (9), a disc (11) positioned in between the brake pads (9), the adjuster unit (100) comprising:
 a threaded adjustment spindle (101; 201') adapted to be operatively coupled with one of the brake pads (9), and to engage a threaded bore (7) provided in the brake caliper (3) such that by rotation in a first direction, the threaded adjustment spindle (101; 201) moves the brake pad (9) towards the disc (11), and by rotation in a second direction opposite of the first direction, the threaded adjustment spindle (101; 201) moves the brake pad away from the disc (11);
 an actuator ring assembly (107; 207) rotatable about the threaded adjustment spindle (101; 201);
 a wrap spring (109; 209) helically wound around the threaded adjustment spindle (101; 201) and operatively coupling the threaded adjustment spindle (101; 201) with the actuator ring assembly (107; 207), and
 a stop (117; 217) for engaging the wrap spring (109, 209);
 wherein during rotation of the actuator ring assembly (107; 207) in the first direction, the actuator ring assembly (107) and the threaded adjustment spindle (101; 201) are non-rotatably connected to one another, and
 wherein during rotation of the actuator ring assembly (107; 207) in the second direction, the actuator ring assembly (107; 207) rotates about the threaded adjustment spindle (101; 201);
 wherein the wrap spring (109; 209) is positioned on the adjuster unit, to engage the stop (117; 217) upon rotation of the threaded adjustment spindle (101; 201) in the second direction, causing the diameter of the wrap spring (109; 209) to increase;
 wherein the adjuster unit further comprises a support clip (111), the support clip (111) holding the actuator ring assembly (107; 207) and being adapted to be non-rotatably mounted to the brake caliper (3), wherein the support clip (111) engages the wrap spring (109; 209) upon rotation of the threaded adjustment spindle (101; 201) in the second direction.

2. The adjuster unit (100; 200) of claim 1, wherein the wrap spring (109; 209) is located between the threaded adjustment spindle (101; 201) and the actuator ring assembly (107; 207).

3. The adjuster unit (100; 200) of claim 1, wherein the stop (217; 117) is non-rotatably positioned in a location where it engages an end portion (209b; 109b) of the wrap spring (209; 109) when the threaded adjustment spindle (201; 101) rotates in the second direction.

4. The adjuster unit (100) of claim 1, wherein the stop (117) is formed as a protrusion on the support clip (111).

5. The adjuster unit (100) of claim 1,
 wherein the support clip (111) is formed as an open ring.

6. The adjuster unit (100) of claim 1,
 wherein the support clip (111) holds the actuator ring assembly (107) in a snap-fit, and is axially fixed to the actuator ring assembly (107).

7. The adjuster unit (100; 200) of claim 1,
 wherein the adjuster unit (100; 200) comprises a pivot lever (119; 219) acting upon the actuator ring assembly (107; 207) in a direction transverse to a longitudinal axis (A) of the threaded adjustment spindle (101; 201), causing the actuator ring assembly (107; 207) to rotate in the first direction.

8. The adjuster unit (100) according to claim 1,
 wherein the support clip (111) is made of spring steel.

9. A vehicle disc brake (1) for a commercial vehicle, the disc brake (1) comprising:
 a brake caliper (3),
 a pair of brake pads (9),
 a disc (11) positioned in between the brake pads (9), and the adjuster unit (100; 200) according to claim 1.

10. The adjuster unit of claim 1, wherein the wrap spring (109; 209) is positioned on the threaded adjustment spindle (101; 201).

11. The adjuster unit of claim 1, wherein the support clip (111) holding the actuator ring assembly (107; 207) is adapted to be non-rotatably mounted to the thrust piece (5).

12. The adjuster unit (100) of claim 1,
 wherein the support clip (111) comprises at least one spring element (118), the spring element (118) being adapted to elastically support the adjuster unit (100) against the thrust piece (5) in the transverse direction of the threaded adjustment spindle (101).

13. The adjuster unit (100) of claim 12,
wherein the spring element (118) extends radially outwards from the support clip (111).

14. The adjuster unit (100) according to claim 1,
wherein the support clip (111) comprises at least one form-lock connection element (120, 120*a,b*) for positively securing the support clip (111) to the brake caliper (3).

15. The adjuster unit (100) of claim 14,
wherein the form-lock connection element (120, 120*a,b*) is formed as a tab extending radially outwards from the support clip (111).

16. The adjuster unit (100) according to claim 14,
wherein at least one of the stop (117), the spring element (118) and the form-lock connection element (120, 120*a,b*) are integrally formed with the support clip (111).

17. The adjuster unit (100) according to claim 16,
wherein at least one of the stop (117), the spring element (118) and the form-lock connection element (120, 120*a,b*) are formed on the support clip (111) by at least one of cutting or bending.

\* \* \* \* \*